United States Patent [19]

Nett et al.

[11] Patent Number: 5,345,839
[45] Date of Patent: Sep. 13, 1994

[54] SOUND-DAMPED FITTING OF A DRIVE SYSTEM

[75] Inventors: Hans-Peter Nett, Marktoberdorf; Robert Honzek, Oberthingau; Richard Heindl; Rainer Hommel, both of Marktoberdorf, all of Fed. Rep. of Germany

[73] Assignee: Xaver Fendt & Company, Fed. Rep. of Germany

[21] Appl. No.: 838,213

[22] PCT Filed: Jun. 25, 1991

[86] PCT No.: PCT/EP91/01182

§ 371 Date: May 11, 1992

§ 102(e) Date: May 11, 1992

[87] PCT Pub. No.: WO92/01176

PCT Pub. Date: Jan. 23, 1992

[30] Foreign Application Priority Data

Jul. 11, 1990 [DE] Fed. Rep. of Germany ....... 4022049

[51] Int. Cl.$^5$ .............................................. F16H 57/02
[52] U.S. Cl. .................................. 74/606 R; 475/246
[58] Field of Search ............... 74/606 R, 606 A, 608; 475/246, 334, 347, 348

[56] References Cited

U.S. PATENT DOCUMENTS

| | | | |
|---|---|---|---|
| 4,597,310 | 7/1986 | Panttila | 74/606 R |
| 4,686,868 | 8/1987 | Heidrich | 74/606 R |
| 4,803,896 | 2/1989 | MacGregor | 74/607 X |
| 5,125,289 | 6/1992 | Heidrich | 74/607 X |
| 5,138,903 | 8/1992 | Grossenbacher | 74/606 R |

FOREIGN PATENT DOCUMENTS

| | | | |
|---|---|---|---|
| 61-82070 | 4/1986 | Japan | 74/606 R |
| 4-63726 | 2/1992 | Japan | 74/606 R |
| 4-113062 | 4/1992 | Japan | 74/606 R |
| 1425396 | 9/1988 | U.S.S.R. | 74/606 R |

Primary Examiner—Vinh T. Luong
Attorney, Agent, or Firm—Antonelli, Terry, Stout & Kraus

[57] ABSTRACT

In order to maintain the sound emission of a vehicle drive with a hydrostatic drive system within tolerable limits, a hydrostatic drive is supported with respect to a gear box by way of structure-borne noise damping components seated in axial drillings or bores of a larger diameter in the gearbox into which the hydrostatic drive is axially inserted with correspondingly larger cylindrical bearing surfaces. The hydrostatic drive is insertable by way of a closable aperture in the gearbox and is supported in an operative position by rods arranged obliquely to the drive shaft and output shaft of the hydrostatic drive, with the rods being supported at respective ends by way of structure-borne noise damping components inserted in through holes in the gearbox and firmly secured to the casing of the hydrostatic drive.

10 Claims, 3 Drawing Sheets

SOUND-DAMPED FITTING OF A DRIVE SYSTEM

FIELD OF THE INVENTION

The invention relates to a mounting, damped against sound. radiation, of a drive system, especially a hydrostatic transmission, within a vehicle gearbox.

BACKGROUND OF THE INVENTION

In conventional mountings of the aforementioned type described, for example, in DE 3,843,272 A1, the hydrostatic transmission is inserted in the gearbox through an axial aperture. The axial and radial fixation of the hydrostatic transmission with respect to the gearbox is accomplished by cord-like elastic bearing elements, in each case being attached continuously onto continuous bearing surfaces of the hydrostatic transmission on the end side, and engaging, in the installed position, into fitting drilled recesses in the gearbox. Since the bearing surfaces for the elastic bearing elements are attached, for structural reasons, to the outer periphery of the hydrostatic transmission, they have a relatively large diameter. Such diameter, though not generally to be absolutely rejected with a view toward a low specific load and the damping function of the bearing elements, is not a desirable feature, either, due to the associated expensive machining of the casing, since expensive special machinery is needed for a dimensionally accurate machining in the diameter of bearing surfaces of this size.

Moreover, in the know bearing for the torque support of the hydrostatic drive mechanism, additional elastic damping elements are required having a relatively voluminous structure and require a seating in the gearbox and in the hydrostatic transmission that is not easy to provide.

The replacement of inoperative damping elements is furthermore made difficult in that the hydrostatic transmission must for this purpose be removed from the gearbox which process, in turn, is impossible without previously also removing the gear box from the vehicle.

SUMMARY OF THE INVENTION

Starting with a vehicle with the aforedescribed mounting for the hydrostatic transmission an object of the invention resides in providing a bearing that is damped with respect to sound radiation and, with a low specific stress, utilizing damping elements of a relatively small dimension.

In accordance with advantageous features of the present invention, a sound-radiation damped mounting for a drive system is provided, especially for a hydrostatic transmission within a vehicle gearbox, with the sound-radiation damped mounting including structure-borne noise decoupling damping elements arranged in a forward and rearward end zone of the hydrostatic. transmission between the vehicle gearbox and a support for conducting structure-borne noise of the hydrostatic transmission. The hydrostatic transmission may be inserted into the gearbox through a closeable casing wall aperture and is supported, in an operative position, by rods extending transversely to the drive shaft and a driven shaft of the hydrostatic transmission. The rods are supported on the inside by way of annular structure-borne noise decoupling damping elements inserted in through bores of the gearbox and fixedly connected to the casing of the hydrostatic transmission.

Considerable advantages are provided by the invention during the mounting of the hydrostatic transmission and of the damping elements as well as during the manufacturing of the respective structural parts. Thus, due to the fact that the gearbox is accessible even in the installed condition through an opening arranged suitably at the bottom or at the top, the installation and dismounting of the hydrostatic transmission on the occasion of vehicle assembly or repair is made simpler than previously since the gearbox or the adjoining casings need not be disassembled for this purpose. A satisfactory coaxial orientation of the input and output shafts of the hydrostatic transmission with the connecting shafts can be conveniently achieved by first coupling the respective shafts together, after laying out the rod-shaped supports, before the hydrostatic transmission is fixed on the rod-shaped supports having relatively small transverse dimensions. Because of the small transverse dimensions of the supports, the dimensions of the damping elements as well as their mounting bores in the gearbox likewise remain very small so that, in case of geometrically simple configuration, no manufacturing difficulties need to be expected. The required damping elements can all be of the same shape, taking over the axial and radial forces as well as the torque support for the hydrostatic transmission. Damping elements that are not functioning can be removed, on account of their ready accessibility from the outside, without any great effort, and can be replaced by operable ones.

In accordance with further advantageous features of the present invention, the respective rods are inserted in the forward and rearward end zones of the hydrostatic transmission, with the rods being mutually offset with respect to each other in a height direction.

By virtue of the last noted feature of the present invention, it is ensured that, during a resilient movement of the damping elements, minimum deviations occur between the drive shaft and the driven shaft of the hydrostatic transmission.

In accordance with still further features of the present invention, the output shaft of the hydrostatic transmission, as viewed in the axial direction, is located at least approximately centrally between the rods, with the rods being connected to the housing of the hydrostatic transmission by way of a clamping connection.

Furthermore, according to the present invention, axial and/or radial movements of the rods are restricted by axial stops and radial stops, with at least one of the rods having a play free contact at a front side initially with an elastic action structure-borne noise decoupling damping element, for example, a disc, and, after a permissible or predetermined axial vibration has been exceeded, the rod comes into contact with an in-elastic axial stop.

A damping element of the present invention may be placed onto an end-side stub of a rod with the damping element projecting with a collar beyond a front side of the rod stub and being compressible by a stop disk pressed against the front side. The stop disk extends, with the formation of an annular gap with respect to the gearbox, over a zone or area of a collar and, respectively, through the through bore radially toward the outside.

In order to enable a limiting of radial movements of the rod, a disk may be arranged on one of the rods or a partial section of a rod may be guided with a predetermined radial play in the through bore.

BRIEF DESCRIPTION OF THE DRAWINGS

One embodiment of the invention will be described in greater detail with reference to a drawing, wherein.

DETAILED DESCRIPTION

Figure 1:
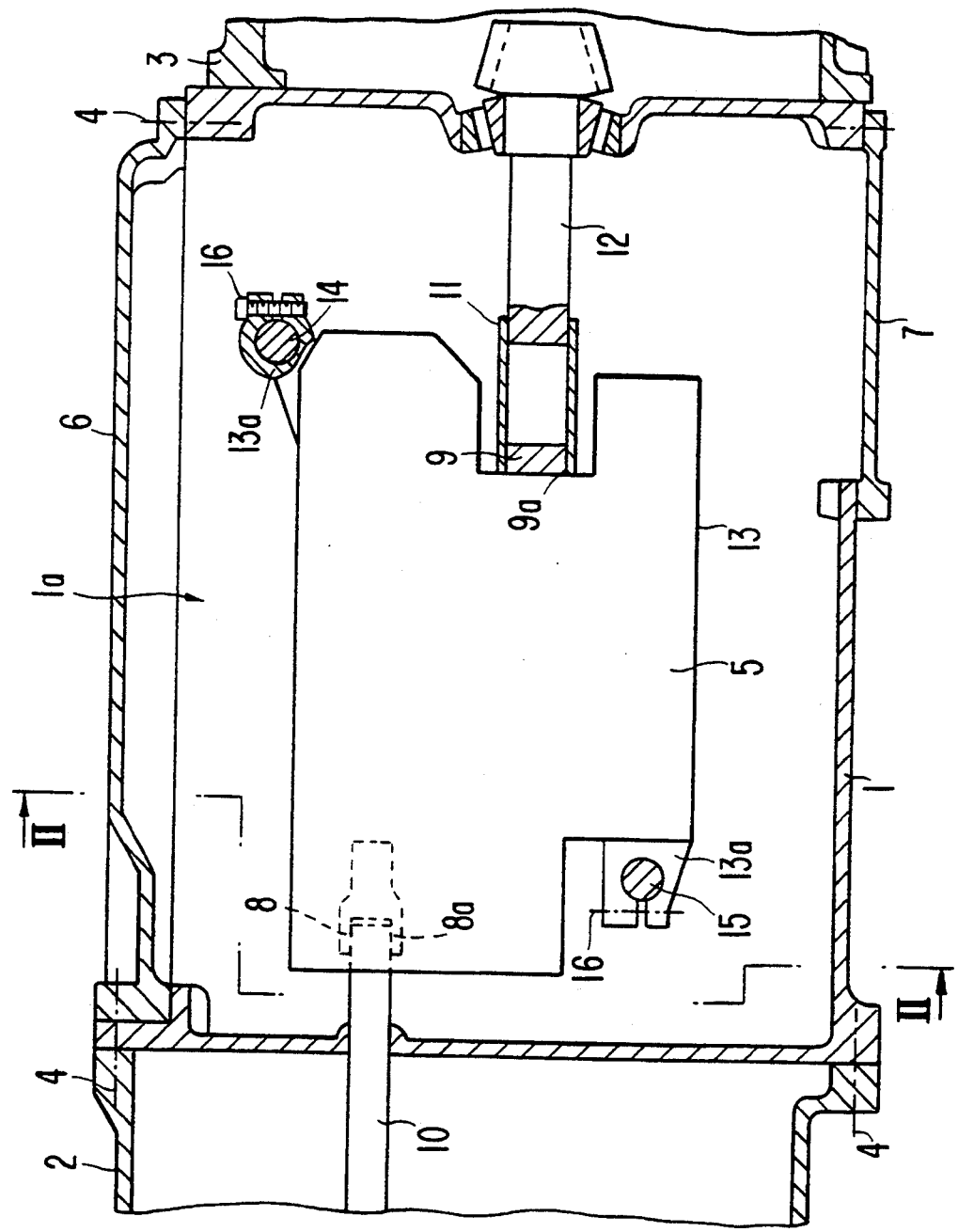
FIG. 1 is a vertical longitudinal section through a mounting of a hydrostatic transmission in a gearbox.

The gearbox 1, forming part of a vehicle drive mechanism, is inserted according to FIG. 1 between a clutch housing 2 and a final output housing 3 and is connected to the aforementioned housings by means of screws 4. Since in the type of vehicle contemplated in this embodiment, the gearbox 1 is considered to be readily accessible from the top, the gearbox 1 is open at the top. The thus-formed housing wall opening 1a serves for the insertion or removal of a hydrostatic transmission 5 installed in the gearbox 1 so that it is damped with respect to radiated sound. This opening is sealed with a cover 6. For the sake of providing easier accessibility in the interior of the gearbox 1, an opening closable by a plate 7 is also provided in the bottom housing wall.

Merely the drive shaft 8 and the driven shaft 9 are denoted among the gear parts of the hydrostatic transmission 5 important to the transmission function. Both the drive and driven shafts 8, 9 are respectively provided in their free end zones with splines 8a, 9a by way of which they can be coupled with the neighboring shafts. Thus, the drive shaft 8, provided with hollow splines 8a, accommodates the clutch output shaft 10 which latter, for this purpose, is displaceably supported in the longitudinal direction whereas the output shaft 9 is coupled with the final output shaft 12 by way of a sliding sleeve 11 equipped with a hollow splined shaft profile. In order to further reduce the noise level of the entire drive mechanism, a torsional vibration damper can be inserted in the power train of the clutch output shaft 10, and the sliding sleeve 11 can be replaced by an elastic coupling.

Respectively two clamping eyes 13a are arranged at a mutual spacing at the housing 13 on diametrically opposed end zones of the housing 13 of the hydrostatic transmission 5 which in the drawing, as shown in the left-hand end zone at the bottom and in the right-hand end zone at the top. The clamping eyes 13a exhibit unilaterally slotted through bores extending transversely to the longitudinal direction of the drive shaft 8 and output shaft 9, respectively. A rod 14 and 15, respectively, is passed through the through bores of respectively adjacent clamping eyes 13a and is fixedly braced with the housing 13 with the aid of a clamping screw 16

Figure 2:
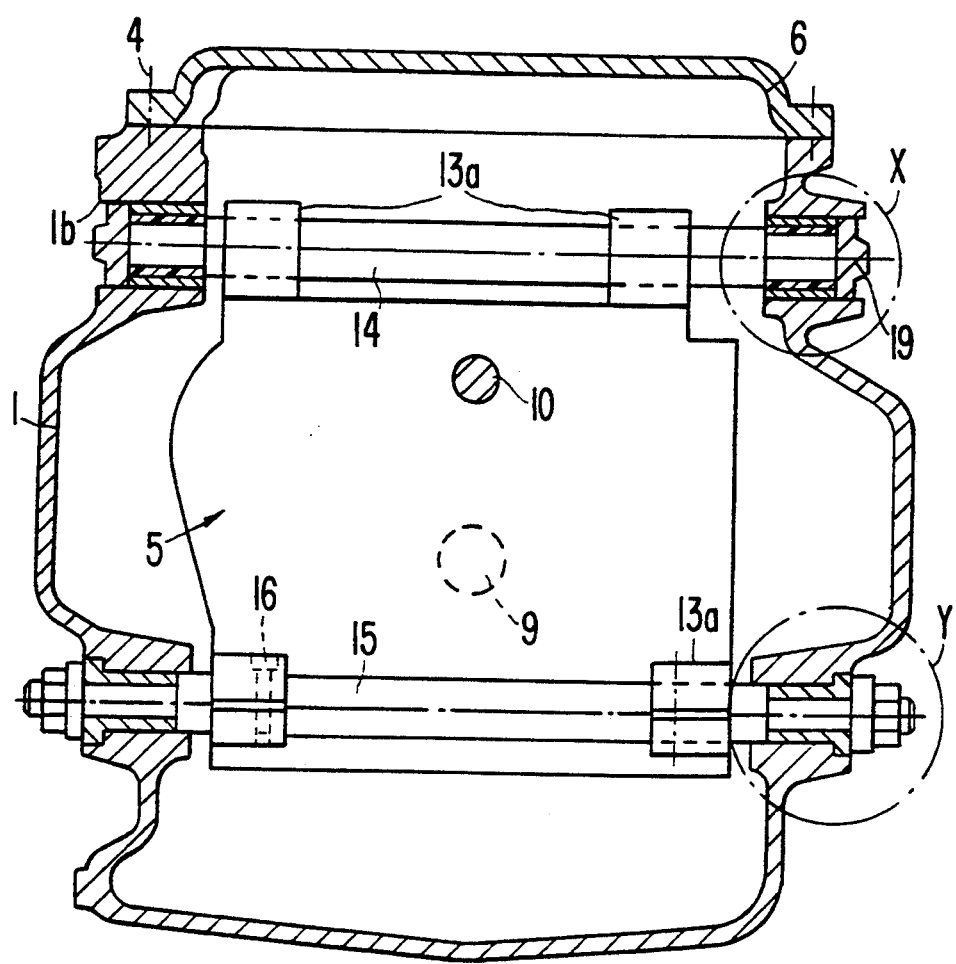
FIG. 2 is a sectional view of the mounting taken along the line II—II in FIG. 1.

The free end zones of the rods 14, 15 project into through bores 1b of the gearbox 1 and are supported radially as well as axially in the through bores 1b by way of conventional elastic damping element 17, 18. In FIG. 2, two different embodiments are illustrated for the supporting of the rods 14, 15 and thus of the hydrostatic transmission 5 within the gearbox 1. However, actually, only a single design will be considered in such a unit for the bearing means.

Figure 3:
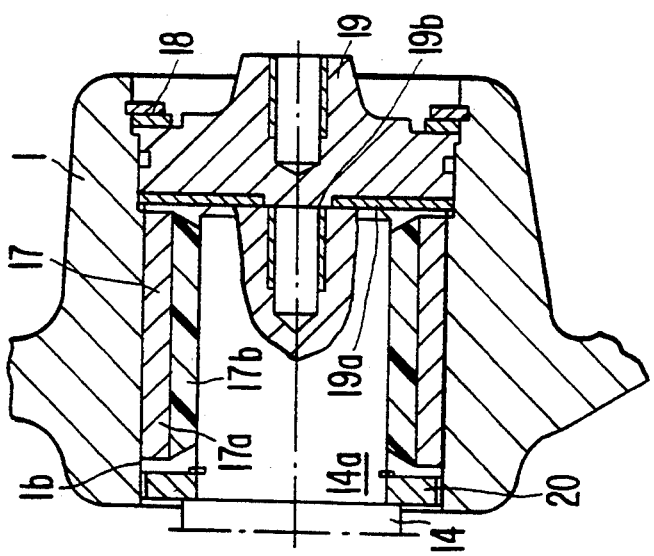
FIG. 3 is an enlarged detail view of an elastic bearing of a supporting rod in the encircled area X in FIG. 2.

The upper mounting, as shown, can be seen in FIG. 3 on an enlarged scale. According thereto, the damping element 17 includes an annular metal member 17a with an internal, vulcanized-on rubber layer 17b, pushed without play onto the end zone of rod 14. All of the forces acting in the longitudinal direction of the hydrostatic transmission 5, as well as forces resulting from the torque support, exert a stress on this damping element 17 advantageously exclusively in the radial direction. A stop disk 19 axially fixed by a locking ring 18 is inserted in each through bore 1b for absorbing transverse forces and, in particular, for the axial fixation of the rod 14. This stop disk 19 carries a shim 19a of an elastic material on its front side facing the rod 14, the rod 14 being in contact with this shim without axial clearance. The elastic shim 19a has adequate width to elastically absorb normal axial vibrations of the rod 14. In the case of the occurrence of abnormally large axial vibrations, the rod 14 comes, with its front face, in contact with the inner shoulder 19b of the stop disk 19 whereby a further increase in axial vibrations is counteracted. A disk 20 affixed to a shoulder 14a of the rod 14 and disposed within the through bore 1b offers the same effect with regard to excessive radial vibrations of the rod 14. The disk 20 is provided with a small play with respect to the through bore 1b, permitting the rod 14 to execute merely those radial vibrations that are within a permissible magnitude.

Figure 4:
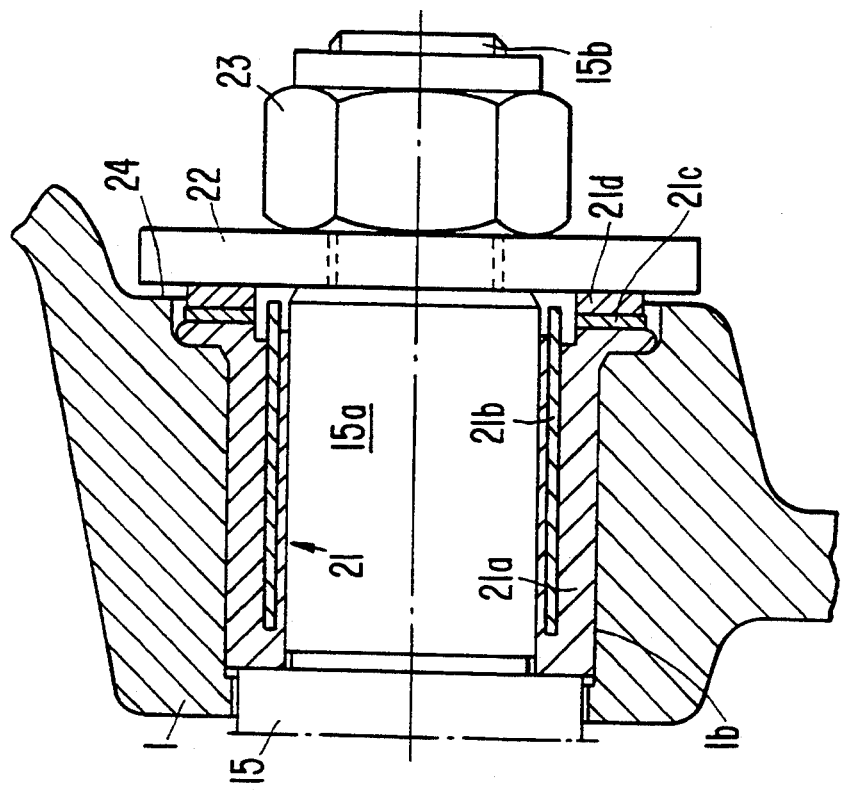
FIG. 4 is an enlarged detail view of a second embodiment of an elastic bearing in the encircled area Y in FIG. 2.

The lower support for the rod 15, in FIGS. 2 and 4, an elastic damping element 21, a tubular metal member 21b and a disk-shaped metal member 21c being embedded in the rubber body 21a of this damping element. This damping element 21 must be compressed after insertion in the annular space between the through bore 1b and a rod stub 15a in such a way that it is in contact with the wall of the through bore 1b with hitch radial force and thus is capable of absorbing high axial and radial rod forces. Compression of the damping element 21 takes place by tightening a screw nut 23 pressing a stop disk 22 against the collar 21d of the damping element 21. The screw nut 23 can be threaded on a threaded stem 15b at the end face of the stub 15a. Since this takes place in both end zones of the rod 15, the rod 15 is fixedly clamped in place axially and can execute only minor, permissible axial vibrations. Unduly high axial vibrations of the rod 15 are prevented by the feature that the stop disk 22 is located outside of the through bore 1a and projects radially past this bore, there being left between this disk and the gearbox 1b a defined vacancy corresponding to the size of the permissible axial vibrations. A portion of the rod 15 serves as the stop for suppressing unduly large radial vibrations of the rod 15, in that the rod 15 dips with a somewhat smaller diameter into a portion of the through bore 1b unaffected by the damping element 21.

During assembly, the hydrostatic transmission 5 is lowered by a suitable lifting tool from above through the housing wall opening 1a into the gearbox 1. As soon as two neighboring through bores in the clamping eyes 13a are located at the level. of the through bores 1b of the gearbox 1, the associated rod 14, 15, with the clamping screws 16 being loosened, is placed from the outside. After installation of the damping elements 17 and 21, respectively, and the stop disks 19 and/or the tightening of the screw nuts 23, the rods 14, 15 are fixed in place in all directions. After the corresponding placing step of the rods 14, 15 has also been accomplished at the other end zone of the hydrostatic transmission 5, the hydrostatic transmission is brought into its operating position by alignment in the transverse direction. The hydrostatic transmission 5 is now safely carried by the rods 14, 15 so that at this point the previously pushed-back clutch output shaft 10 is to be inserted in the drive shaft 8, and the sliding sleeve 11 is to be placed over the final output shaft 12. Thereafter, the hydrostatic transmission 5 can be secured in the assumed position by tightening the clamping screws 16. This position of the hydrostatic transmission on the rods 14, 15, once determined to be correct, can then be made locatable again permanently by conventional steps, such as, for example by drilling the two components and insertion of locking pins in this bore.

If, after a relatively long operating period, the functional ability of a damping element is reduced, this element can be replaced without disassembly of the hydrostatic transmission, on account of the ready accessibility of this element from the outside. For this purpose, it is merely necessary, in a mounting according to FIG. 3, for example, to remove the stop disk 19 from the through bore 1b containing the damping element 17 to be exchanged, and to pull the associated rod 14, after releasing its clamping connection, out to such an extent that the damping element 17 seated thereon can be seized and removed. In this procedure, the rod 14 remains centered within the through bore 1b by the disk 20. The damping element 21 of the mounting in accordance with FIG. 4 can be removed in an even simpler way since, after releasing the screw nut 23 and removal of the disk 22, it has lost its radial tensioning force and can be easily pulled out of the through bore 1b. In this case, it is not even necessary to release the clamping connection of the rod 15 with the hydrostatic transmission 5.

We claim:

1. Sound-radiation-damped mounting of a drive system within a vehicle gearbox, comprising noise decoupling damping elements arranged in forward and rearward end zones of the drive system between the vehicle gearbox and drive system supports for conducting structure-borne noise of the drive system, said gearbox including a casing wall with a closable casing wall aperture for enabling an insertion of the drive system into said gearbox, and wherein said drive system supports include rods extending transversely to a drive shaft and a driven shaft of the drive system for supporting the drive system in an operative position within said gearbox, wherein said rods are supported at ends thereof with respect to said vehicle gearbox by way of said noise decoupling damping elements in the form of annular elements inserted in through bores of the vehicle gearbox, and wherein said rods are fixedly connected to said drive system.

2. Mounting according to claim 1, wherein respective ones of said rods are inserted in each of the forward and rearward end zones of the drive system.

3. Mounting according to claim 1 or 2, wherein said rods are mutually offset with respect to the height of said drive system.

4. Mounting according to claim 3, wherein said rods are arranged in such a manner that the output shaft of the drive system, as viewed in an axial direction, is located at least approximately centrally between said rods.

5. Mounting according to claim 1 or 2, wherein said rods are connected to a housing of the drive system by clamping connections on the housing.

6. Mounting according to claim 1, wherein at least one of axial and radial movements of the rods with respect to the through bores in said vehicle gearbox are restricted by stops.

7. Mounting according to claim 6, wherein at least one rod is in a play-free contact at an axial, front side initially with an elastically acting structure-borne noise decoupling damping element and, after permissible axial vibrations have been exceeded, comes into contact with an inelastic axial stop.

8. Mounting according to claim 6, wherein one of said damping elements is placed onto an end-side rod-stub of one of said rods, said damping element projecting with a collar beyond a front side of the rod stub and being compressible by a stop disk pressed against the front side, said stop disk extending, with the formation of an annular gap with respect to the vehicle gearbox, over a zone of the collar and, respectively, the through bore radially toward the outside.

9. Mounting according to claim 6, wherein, for limiting the radial movements of the rods in said through bores each rod end has at least one of a disk arranged on the rod and a partial section of the rod guided with a predetermined radial play in the associated through bore.

10. Mounting according to claim 1, wherein said drive system is a hydrostatic transmission.

* * * * *